US010429528B2

(12) United States Patent
Dykstra et al.

(10) Patent No.: US 10,429,528 B2
(45) Date of Patent: Oct. 1, 2019

(54) REDUCING MICROSEISMIC MONITORING UNCERTAINTY

(71) Applicant: Halliburton Energy Services, Inc., Houston, TX (US)

(72) Inventors: Jason D. Dykstra, Spring, TX (US); Zhijie Sun, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 332 days.

(21) Appl. No.: 15/518,572

(22) PCT Filed: Nov. 19, 2014

(86) PCT No.: PCT/US2014/066387
§ 371 (c)(1),
(2) Date: Apr. 12, 2017

(87) PCT Pub. No.: WO2016/080981
PCT Pub. Date: May 26, 2016

(65) Prior Publication Data
US 2017/0234999 A1    Aug. 17, 2017

(51) Int. Cl.
*E21B 43/26*    (2006.01)
*G01V 1/28*    (2006.01)
(Continued)

(52) U.S. Cl.
CPC .......... *G01V 1/288* (2013.01); *E21B 41/0092* (2013.01); *E21B 43/26* (2013.01);
(Continued)

(58) Field of Classification Search
CPC .... E21B 47/091; E21B 47/101; E21B 49/003; E21B 43/26; E21B 41/0092
See application file for complete search history.

(56) References Cited

U.S. PATENT DOCUMENTS 2,747,172 A    6/1956   Bayhi
6,814,160 B1   11/2004   Scott
(Continued)

FOREIGN PATENT DOCUMENTS

CA     2896497     7/2014
CA     2915625     1/2015
(Continued)

OTHER PUBLICATIONS

Canadian Patent Application No. 2,964,863 , "Office Action", dated Jan. 21, 2019, 5 pages.
(Continued)

*Primary Examiner* — Cathleen R Hutchins
(74) *Attorney, Agent, or Firm* — Kilpatrick Townsend & Stockton LLP

(57) ABSTRACT

Uncertainty of microseismic monitoring results can be reduced to improve hydraulic fracture modeling. A computing device can use a fracture model to determine a predicted geometry of a hydraulic fracture in a subterranean formation based on properties of a fracturing fluid that is introduced into the subterranean formation. An uncertainty index of the predicted geometry of the hydraulic fracture can be determined based on an uncertainty value of the predicted geometry and a trend of uncertainty values. When the injection flow rate of the fracturing fluid is less than a maximum flow rate, it can be increased from an initial injection flow rate to an increased injection flow rate in response to determining the uncertainty index exceeds a pre-set maximum.

18 Claims, 6 Drawing Sheets

(51) Int. Cl.
  *G01V 1/42* (2006.01)
  *G01V 1/50* (2006.01)
  *E21B 47/12* (2012.01)
  *E21B 41/00* (2006.01)
  *E21B 49/00* (2006.01)

(52) U.S. Cl.
  CPC .............. *E21B 47/12* (2013.01); *E21B 49/00* (2013.01); *G01V 1/42* (2013.01); *G01V 1/50* (2013.01); *G01V 2210/1234* (2013.01); *G01V 2210/1429* (2013.01); *G01V 2210/646* (2013.01)

(56) References Cited

U.S. PATENT DOCUMENTS

| | | |
|---|---|---|
| 10,338,247 B2 | 7/2019 | Dykstra et al. |
| 2003/0050758 A1 | 3/2003 | Soliman et al. |
| 2008/0004847 A1 | 1/2008 | Bradford et al. |
| 2008/0149329 A1 | 6/2008 | Cooper et al. |
| 2008/0164021 A1 | 7/2008 | Dykstra et al. |
| 2009/0059721 A1 | 3/2009 | Simon et al. |
| 2009/0166029 A1 | 7/2009 | Maksimenko et al. |
| 2009/0315539 A1 | 12/2009 | Helwig et al. |
| 2009/0316524 A1 | 12/2009 | Tenghamn et al. |
| 2010/0252268 A1 | 10/2010 | Gu et al. |
| 2010/0262373 A1 | 10/2010 | Khadhraoui et al. |
| 2010/0307755 A1 | 12/2010 | Xu et al. |
| 2011/0120702 A1 | 5/2011 | Craig et al. |
| 2011/0120706 A1* | 5/2011 | Craig .................. E21B 43/26 166/270 |
| 2012/0300582 A1 | 11/2012 | Winter et al. |
| 2013/0081805 A1 | 4/2013 | Bradford et al. |
| 2013/0090902 A1 | 4/2013 | Yao et al. |
| 2014/0100786 A1 | 4/2014 | Ma et al. |
| 2014/0372089 A1 | 12/2014 | Weng et al. |
| 2015/0066458 A1 | 3/2015 | Coles et al. |

FOREIGN PATENT DOCUMENTS

| | | |
|---|---|---|
| WO | 2014105659 | 6/2014 |
| WO | 2016080980 | 5/2016 |
| WO | 2016105351 | 6/2016 |

OTHER PUBLICATIONS

Swanson et al., "Report of Investigations 9395, Accuracy and Precision of Microseismic Event Locations in Rock Burst Research Studies", United States Department of Interior, pp. 46, 1992.

Wright et al., "Downhole Tiltmeter Fracture Mapping: Finally Measuring Hydraulic Fracture Dimensions", SPE Western Regional Conference, Society of Petroleum Engineers, Inc., 1998.

International Patent Application No. PCT/US2014/066387, International Search Report and Written Opinion dated Aug. 12, 2015, 8 pages.

Canadian Application No. 2,964,863, Office Action dated Apr. 24, 2018, 5 pages.

* cited by examiner

REDUCING MICROSEISMIC MONITORING UNCERTAINTY

CROSS-REFERENCE TO RELATED APPLICATIONS

This is a U.S. national phase under 35 U.S.C. 371 of International Patent Application No. PCT/US2014/066387 titled "Reducing Microseismic Monitoring Uncertainty" and filed Nov. 19, 2014, the entirety of which is incorporated herein by reference.

TECHNICAL FIELD

The present disclosure relates generally to systems and methods for analyzing a subterranean formation. More specifically, but not by way of limitation, this disclosure relates to improved hydraulic fracture modeling.

BACKGROUND

A well system (e.g., oil or gas wells for extracting fluids from a subterranean formation) can include a wellbore drilled into a formation. Hydraulic fracturing operations can be performed on the wellbore to increase production by pumping a hydraulic fluid down the cased wellbore into the formation at pressures and injection flow rates sufficient to cause the formation rock to initiate and propagate a hydraulic fracture (or induced fracture) into the subterranean formation. Accurate estimation of the geometry of the hydraulic fracture can improve production economics by increasing reservoir productivity and reducing completion costs.

DETAILED DESCRIPTION

Figure 1:
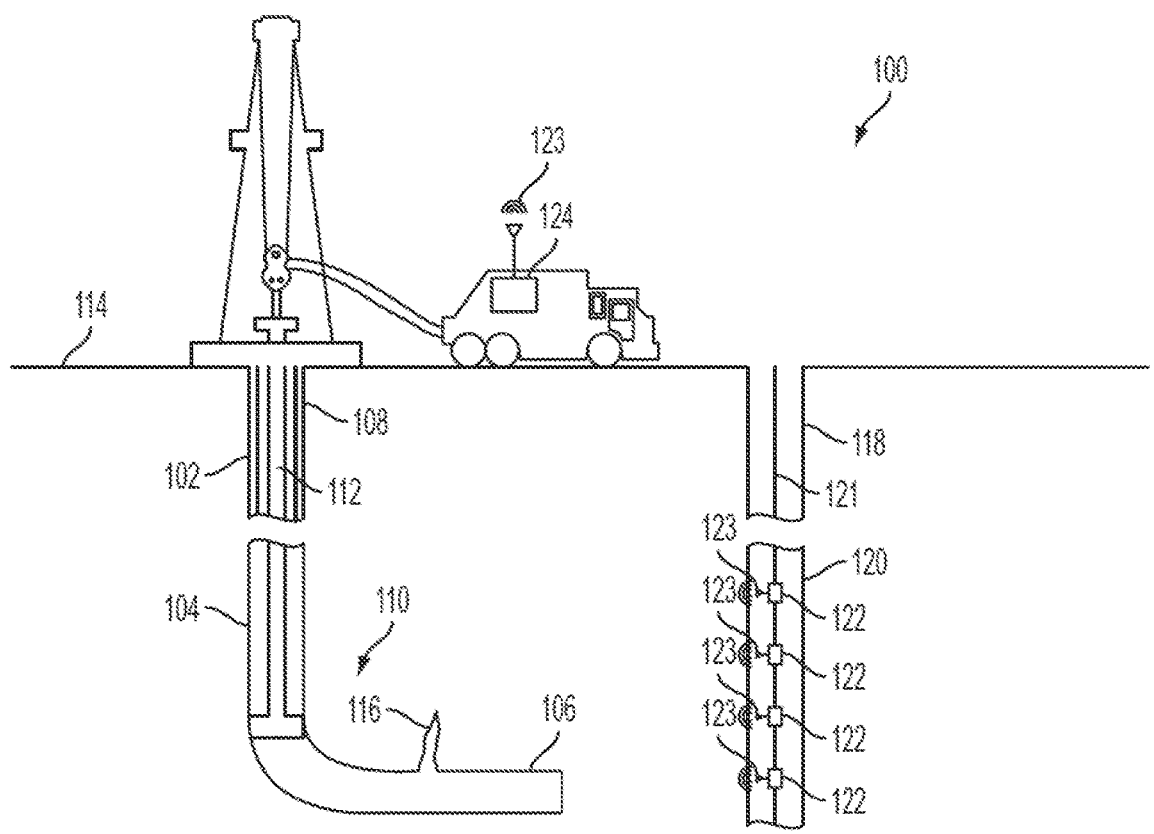
FIG. 1 is a schematic illustration of an active wellbore and a microseismic monitoring uncertainty reduction system according to one aspect of the present disclosure.

Certain aspects and examples of the present disclosure are directed to manipulating the injection flow rate of a fracturing fluid injected into a subterranean formation to reduce the uncertainty associated with microseismic monitoring results used to update a fracture model. A well-updated and well-calibrated fracture model can provide an accurate estimation of the geometry of a hydraulic fracture. Accurate estimation of the geometry of the hydraulic fracture can improve production economics by increasing reservoir productivity and reducing completion costs.

Hydraulic fracturing operations can cause microseismic events to occur in the subterranean formation. Microseismic events in subterranean formations are shear events that are slippages along hydraulic fractures as well as natural fractures, bedding, faults, dewatering features, and other planes of weakness. During a hydraulic fracturing operation, the formation stress and the pore pressure in the formation surrounding a hydraulic fracture are increased. Both the pore pressure increase and formation can cause microseismic events to occur in the subterranean formation proximate to the tip of a hydraulic fracture. A computing device can receive microseismic event data from the sensors that monitor these microseismic events and can determine microseismic monitoring results using additional information about the formation. For example, the computing device can determine the location of the microseismic event and an observed geometry of the hydraulic fracture based on the microseismic event data. For example, the computing device can determine an observed length or observed height of the hydraulic fracture using the microseismic event data.

The computing device can use information about a hydraulic fracturing operation and a fracture model to predict or estimate the geometry of interest of the hydraulic fracture. The fracture model can be updated using the microseismic monitoring results. For example, the computing device can use the observed geometry of interest to update the fracture model. The microseismic monitoring results used to update the fracture model can have a large level of uncertainty. The uncertainty of the microseismic monitoring results can be caused by the distance between the sensors and events, the quality of the velocity model used by the computing device to determine the microseismic monitoring results, and the signal processing algorithm used by the computing device to determine the microseismic monitoring results. Uncertainty of the microseismic monitoring results used to update the fracture model can cause uncertainty in a predicted geometry of the hydraulic fracture based on the fracture model. In some aspects, the microseismic monitoring results can also be used to calibrate the fracture model.

The computing device can determine a covariance of estimation error of the predicted geometry of the hydraulic fracture. The covariance of estimation error can be defined as the covariance of difference between a true geometry of the hydraulic fracture and the predicted geometry of the hydraulic fracture. The covariance of the estimation error can also reflect an uncertainty of the predicted geometry of the hydraulic fracture. For example, the predicted length of a bi-wing hydraulic fracture having a constant height and growing length can determined by the computing device using a fracture model such as the Perkins-Kern-Nordgren (PKN) model. The computing device can determine an observed length of the hydraulic fracture using the microseismic monitoring results and can update the fracture model and determine the covariance of estimation error using the observed and predicted fracture lengths.

The computing device can increase the accuracy of the fracture model by reducing the uncertainty of the microseismic monitoring results. The uncertainty of the microseismic monitoring results can be reduced by increasing the number of simultaneous microseismic events used to update the fracture model.

FIG. 1 is a schematic illustration of a microseismic monitoring uncertainty reduction system 100 according to one aspect. An active wellbore 102 extends through various earth strata. The active wellbore has a substantially vertical section 104 and a substantially horizontal section 106. The substantially vertical section 104 may include a casing string 108 cemented at an upper portion of the substantially vertical section 104. The substantially horizontal section 106 extends through a hydrocarbon bearing subterranean formation 110. A tubing string 112 extends from the surface 114 into the active wellbore 102. The tubing string 112 can provide a conduit for pumping a fracturing fluid into the active wellbore 102 to perform hydraulic fracturing operations on the active wellbore 102. The active wellbore 102 includes a hydraulic fracture 116 (or induced fracture) that extends from the substantially horizontal section 106. Proppant materials can be entrained in the fracturing fluid and deposited in the hydraulic fracture 116 to keep the hydraulic fracture 116 open.

The system 100 can include an observation wellbore 118 extending through various earth strata. The observation wellbore 118 has a substantially vertical section 120. Multiple geophones 122 are positioned on a tool 121 deployed within the observation wellbore 118. In some aspects, transducers, tiltmeters or other suitable sensors may be used in place of the geophones 122. The geophones 122 can monitor microseismic events in the formation 110. For example, the geophones 122 can detect the arrival of the Primary (P) waves and the Secondary (S) waves of a microseismic event in the formation 110 during a hydraulic fracturing operation. In some aspects, tiltmeters may be positioned at the surface 114 proximate the horizontal location of the hydraulic fracture 116 or in shallow holes at the surface 114.

The geophones 122 can be communicatively coupled to a computing device 124. The computing device 124 can be positioned at the surface 114 or at a separate location. In some aspects, the tiltmeters can be communicatively coupled to the computing device 124 and can transmit data sufficient to determine a location of a microseismic event in the formation 110. The computing device 124 can control an injection flow rate of the fracturing fluid that is introduced into the formation 110 during the hydraulic fracturing operation. In some aspects, the computing device 124 can be in communication with a controller or another computing device that controls the injection flow rate of the fracturing fluid.

The computing device 124 can include a processor interfaced with other hardware via a bus. A memory, which can include any suitable tangible (and non-transitory) computer-readable medium, such as random-access memory ("RAM"), ROM, electrically erasable and programmable read-only memory ("EEPROM"), or the like, can embody program components that configure operation of the computing device 124. In some aspects, the computing device 124 can include input/output interface components (e.g., a display, keyboard, touch-sensitive surface, and mouse) and additional storage. The computing device 124 can transmit data to and receive data from the geophones 122 via a communication link 123. The communication link 123 is wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In other aspects, the communication link 123 can be wired and can include interfaces such as Ethernet, USB, IEEE 1394, or a fiber optic interface. An example of the computing device 124 is described in further detail with respect to FIG. 3.

The computing device 124 can use the data received from the array of geophones 122 to determine microseismic monitoring results, for example a location of a microseismic event that occurs in the formation 110 during the hydraulic fracturing operation. For example, the computing device 124 can receive from geophones 122 raw signal data corresponding to the arrival times of the P-waves and S-waves associated with the microseismic event. The computing device 124 can calculate the difference between the travel times of the P-waves and S-waves using data associated with the formation 110 to determine the location of the microseismic event. The computing device 124 can determine the length (hereinafter "observed length") of the hydraulic fracture 116 based on the location of the microseismic event. For example, the computing device can determine an observed length of the hydraulic fracture 116 based on the location of the microseismic event and the assumption that the event occurred at the tip of a hydraulic fracture with a growing length.

The computing device 124 can also determine an estimated or a predicted length of the hydraulic fracture 116 (hereinafter "predicted length") based on a fracture model. In some aspects, the computing device can determine the predicted length of a bi-wing fracture using the PKN model. In some aspects, the computing device 124 can determine a predicted height or other geometry of the hydraulic fracture based on the fracture model. The fracture model can be updated using microseismic monitoring results determined by the computing device 124 using the data received from the array of geophones.

The computing device 124 can also determine an uncertainty value of the predicted length of the hydraulic fracture 116 based on a covariance of estimation error. The covariance of estimation error can be the covariance of difference between a true length of the hydraulic fracture and the predicted length of the hydraulic fracture 116. The computing device 124 can determine an uncertainty index of the predicted length of the hydraulic fracture 116 based on the uncertainty value of the predicted length of the hydraulic fracture 116 and its derivative with respect to time. The computing device 124 can determine if the uncertainty index exceeds a pre-set maximum. The computing device 124 can receive the pre-set maximum from input by a user.

The computing device 124 can perform a process to reduce the uncertainty of the microseismic monitoring results used to update the fracture model when the uncertainty index exceeds the pre-set maximum. In some aspects, the computing device 124 can perform a process that manipulates the injection flow rate of the fracturing fluid to increase the number of microseismic events monitored by the geophones 122 occurring at (or near) the tip of the hydraulic fracture.

Figure 2:
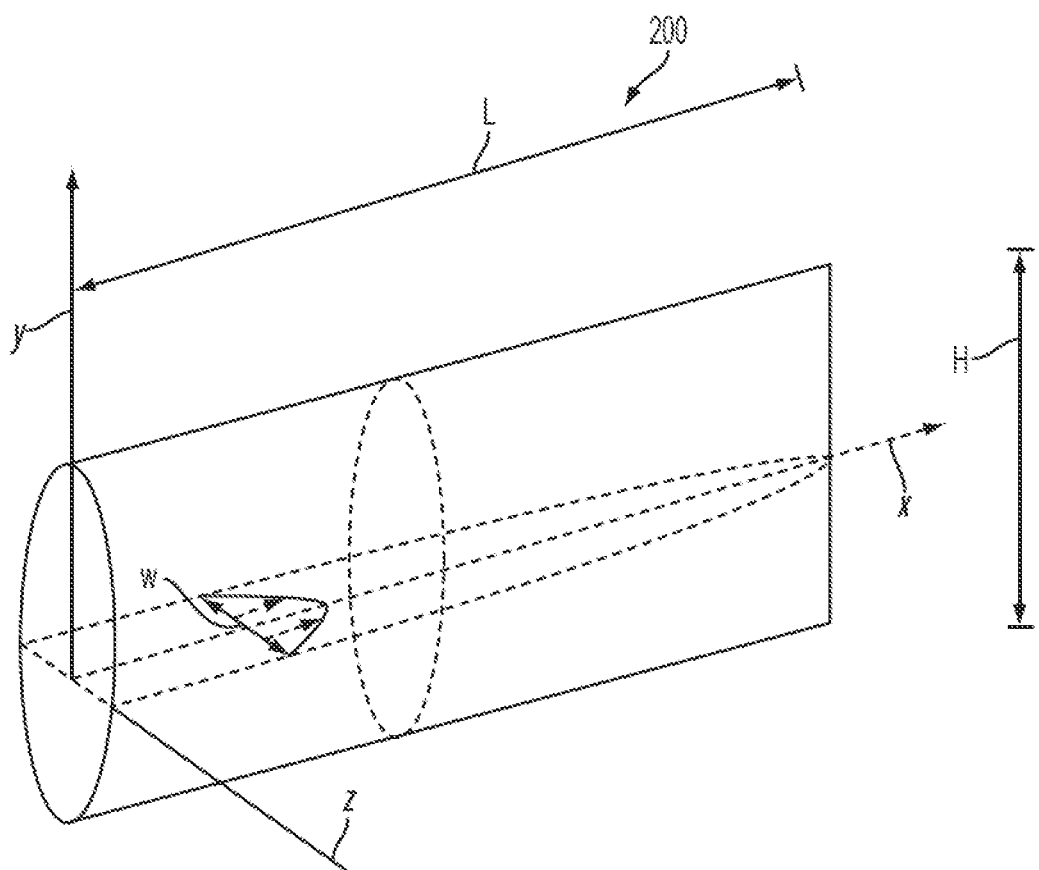
FIG. 2 is an illustration of the Perkins-Kern-Nordgren model of a fracture according to one aspect of the present disclosure.

FIG. 2 is an illustration of the PKN model 200 of a bi-wing hydraulic fracture where the fracture height H is fixed along the y-axis. The computing device 124 can use the PKN model to estimate a hydraulic fracture length L along the x-axis. The width W of the PKN model of the hydraulic fracture is depicted along the z-axis. In some aspects, the computing device 124 can use a different fracture model to predict the geometry of a different type of hydraulic fracture. For example, the Kristonovich-Geertsma-Daneshy (KGD) model can be used in some aspects. The computing device 124 can receive additional data to determine the predicted geometry of the hydraulic fracture when using some fracture models. For example, the computing device 124 may receive a proppant concentration value from an input by a user for use in predicting the geometry of the hydraulic fracture using a fracture model.

Figure 3:
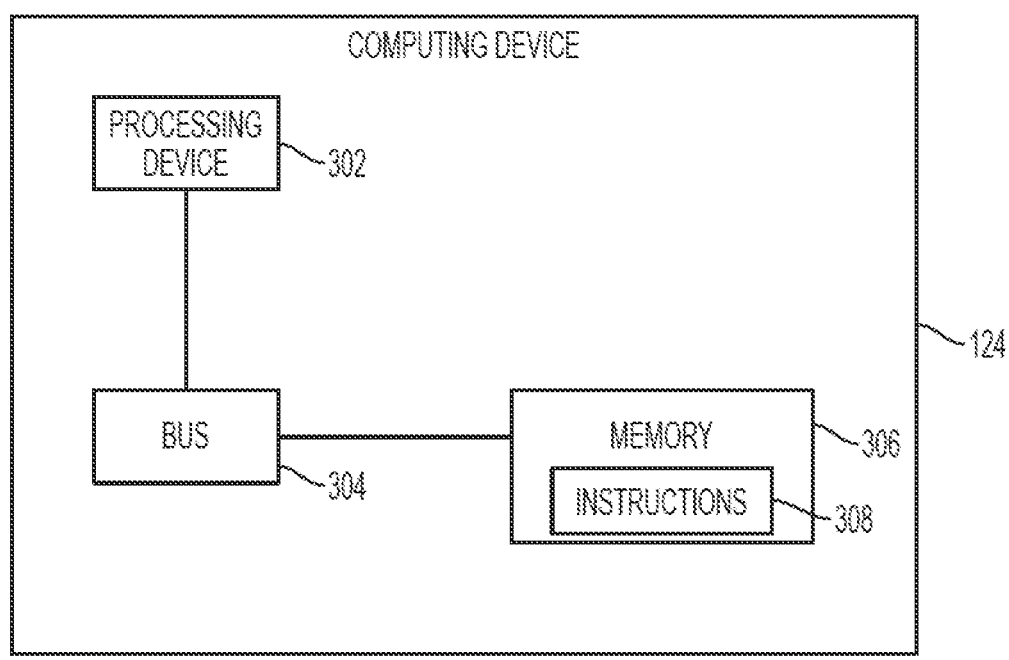
FIG. 3 is a block diagram depicting an example of a computing device for reducing microseismic monitoring uncertainty according to one aspect of the present disclosure.

FIG. 3 is a block diagram depicting an example of a computing device 124 for reducing microseismic monitoring uncertainty according to one aspect of the present disclosure. The computing device 124 includes a processing device 302, a memory device 306, and a bus 304.

The processing device 302 can execute one or more operations for reducing microseismic monitoring uncertainty during hydraulic fracturing operations and modeling of a hydraulic fracture. The processing device 302 can execute instructions 308 stored in the memory device 306 to perform the operations. The processing device 302 can include one processing device or multiple processing devices. Non-limiting examples of the processing device 302 include a Field-Programmable Gate Array ("FPGA"), an application-specific integrated circuit ("ASIC"), a microprocessor, etc.

The processing device 302 can be communicatively coupled to the memory device 306 via the bus 304. The non-volatile memory device 306 may include any type of memory device that retains stored information when powered off. Non-limiting examples of the memory device 306 include EEPROM, flash memory, or any other type of non-volatile memory. In some aspects, at least some of the memory device 306 can include a medium from which the processing device 302 can read the instructions 308. A computer-readable medium can include electronic, optical, magnetic, or other storage devices capable of providing the processing device 302 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions may include processor-specific instructions generated by a compiler or an interpreter from code written in any suitable computer-programming language, including, for example, C, C++, C#, etc.

Figure 4:
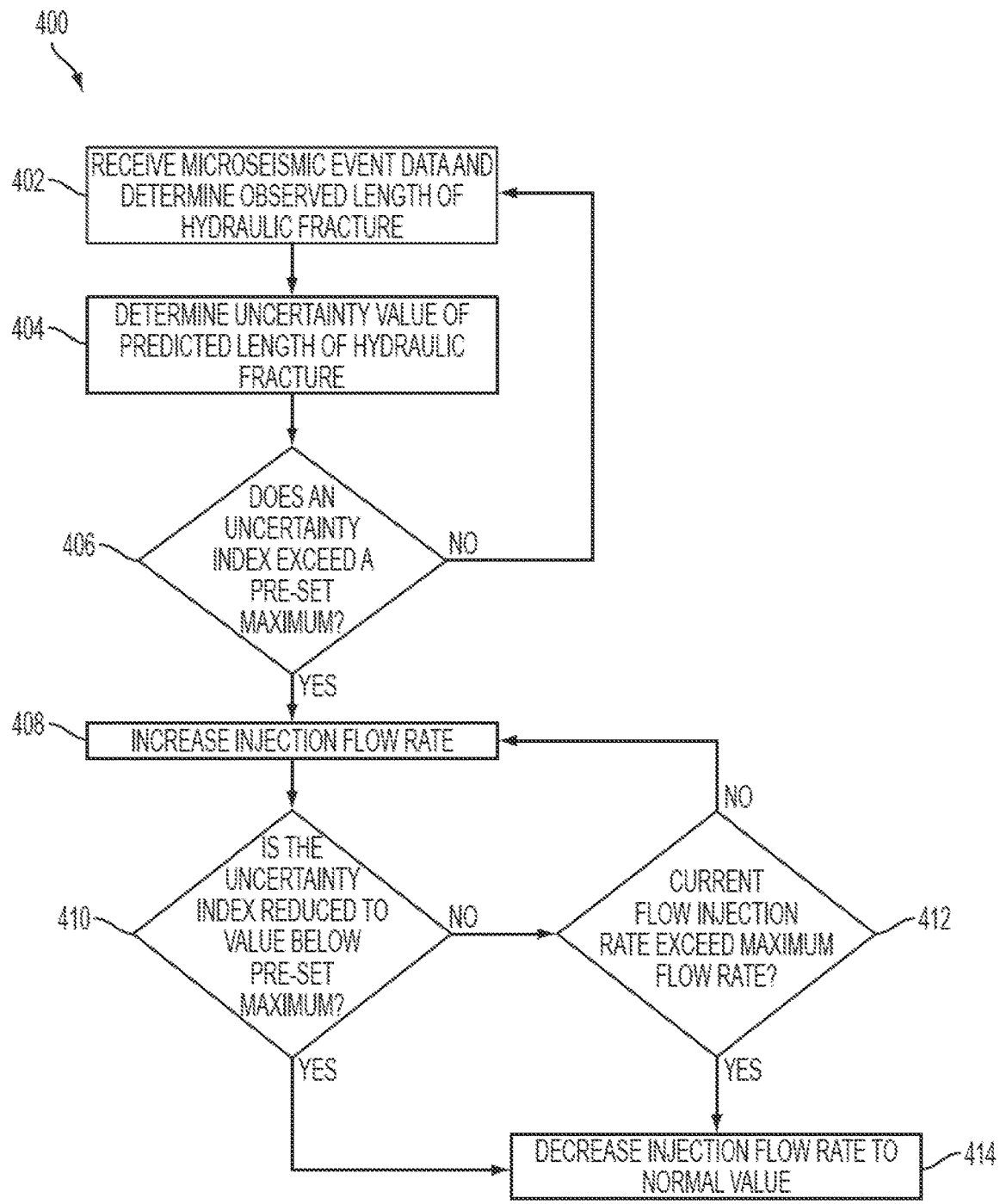
FIG. 4 is an example of a flow chart for a process of reducing microseismic monitoring uncertainty according to one aspect of the present disclosure.

FIG. 4 is an example of a flow chart of a process 400 reducing the uncertainty of microseismic monitoring results according to one aspect of the present disclosure. The process 400 can be performed in whole or in part by the computing device 124 shown in FIG. 3. At block 402 the computing device receives microseismic event data from sensors monitoring a microseismic event and determines an observed length of the hydraulic fracture using the microseismic event data. The microseismic even data can be received during or after the injection of a fracturing fluid into the subterranean wellbore at an initial injection flow rate. The computing device can determine a location of the microseismic event and an observed length of the hydraulic fracture by calculating the difference between the travel times of the P-waves and S-waves of the microseismic event using additional information about the formation. The additional information can include, for example, the number of rock layers in the formation, the velocity of the P-waves and S-waves through each of the rock layers, and the height of each of the rock layers in the formation.

At block 404 the computing device determines an uncertainty value of a predicted length of the hydraulic fracture based on a fracture model. For example, the PKN model can be used to determine a predicted length of a bi-wing hydraulic fracture. The computing device can use information including the injection flow rate of the fracturing fluid and the viscosity of the fracturing fluid to determine the predicted length of the hydraulic fracture based on the fracture model. A bi-wing fracture can be characterized by the PKN model:

$$\frac{\partial w(x,t)}{\partial t} + \frac{\partial q(x,t)}{\partial x} + u_l(x,t) = 0$$

$$q(0,t) = q_0(t)$$

Where $w(x,t)$ is the width of the fracture, $q(x,t)$ is the unit-height injection flow rate, and $u_1(x,t)$ is the unit-height, unit-length, leak-off rate of the fracturing fluid. The injection flow rate of the fracturing fluid at a time t is $q_0(t)$ and can be received by the computing device 124 from an input by a user. The computing device 124 can use Carter's Theory to determine the leak-off rate $u_1(x,t)$, which in the PKN model can be expressed as:

$$u_l(x,t) = \frac{2C_l}{\sqrt{t-\tau(x)}}$$

Where $\tau(x)$ is a function of fracture arrival time (i.e., the time location x is first exposed to fluid) and $C_1$ is the leak-off coefficient.

The computing device 124 can determine the predicted width of the hydraulic fracture in the PKN Model by the pressure profile:

$$\frac{\partial p}{\partial x} = -\frac{2Kq|q|^{n-1}}{\psi^n w^{2n+1}}$$

$$w = M_c p$$

Where p is the net pressure, n is the flow behavior index of power-law fluid, and ψ is the shape factor of the fracture, and $M_c$ is the fracture compliance. The fracture compliance $M_c$ can be determined by known rock mechanics. In some aspects, where n=1 the fluid is Newtonian and the term K becomes the viscosity of the fracturing fluid. The computing device can receive the viscosity of the fracturing fluid from an input by a user.

The computing device can determine the predicted length of the hydraulic fracture based on the fracture model using the following global material balance equation:

$$\int_0^{L(t)} w(x,t)dx + \int_0^t \int_0^{L(t_1)} u_L(x,t_1)dxdt_1 = \int_0^t q_0(t_1)dt_1$$

The computing device can derive a dynamic fracture model by combining the above equations and using the injection flow rate $q_0$ and viscosity of the fracking fluid K. The dynamic fracture model can describe the relationship between $q_0$ and K and the predicted length of the hydraulic fracture as the following linear discrete-time-state-space form:

$$x(k+1) = A_k x(k) + B_k u(k)$$

$$L(k) = C_k x(k)$$

This model can be rewritten with a Kalman filter as:

$$\hat{x}(k+1) = A_k \hat{x}(k) + B_k u(k) + J_k(y(k) - \hat{L}(k))$$

$$\hat{L}(k) = C_k \hat{x}(k)$$

Where u(k) is an input vector that stacks the known input variables together, for example, the injection flow rate and the fracturing fluid viscosity. Specifically $u(k)=[q_0(k)\ K(k)]^T$. The $\hat{x}(k)$ is the estimate of the state vector because the state vector $x(k)$ cannot be measured directly. The $\hat{L}(k)$ is the predicted length of the hydraulic fracture at a time k given the information known about the hydraulic fracture and the hydraulic fracturing operation, for example, the injection flow rate, viscosity of the fracturing fluid, and previous observed lengths of the hydraulic fracture up to a time instant k−1. The y(k) is the observed length of the hydraulic fracture at the time instant k as determined by the computing device using the microseismic event data received from the sensors monitoring the microseismic event.

The vector $J_k$ is the Kalman gain and adjusts how much prediction error the computing device uses to correct the fracture model. Specifically, the prediction error is a function of $y(k)-\hat{L}(k)$. In an aspect where the mechanical properties of the fracture are known perfectly, then the only errors present in the fracture model would be from the microseismic monitoring and $J_k$ should be zero to prevent the microseismic measurement errors from be used to update the fracture model. In some aspects, the computing device can use the microseismic monitoring measurements to update the fracture model, for example by using the measurements to update the state vector. In some aspects, the computing device can also use the microseismic monitoring measurements to calibrate the fracture model. In an aspect where the rock mechanics of the formation are not well known or the fracture propagation is random, Jk should be a large value since the microseismic results are a source of less error than the fracturing process itself. The value of J is given by the following Riccati Equation:

$$P(k+1)=A[P(k)-P(k)C_k^T(C_kP(k)C_k^T+V_k)^{-1}C_kP(k)]A_k^T+W_k$$

$$J_k=A_kP(k)C_k^T(C_kP(k)C_k^T+V_k)^{-1}$$

Where $W_k$ is the covariance matrix of process noise at a time k (i.e., an estimate of randomness and model errors of the fracturing process) and $V_k$ is the covariance matrix of error of the microseismic event location calculated by the microseismic monitoring at time k. Based on these equations, if no microseismic events are available to update the fracture model then the equations become:

$$\hat{x}(k+1)=A_k\hat{x}(k)+B_ku(k)$$

$$P(k+1)=AP(k)A_k^T+W_k$$

The equations at Paragraph [0044] indicate that without updating the fracture model with the microseismic monitoring results (e.g. the observed fracture length) the uncertainty of the predicted length of the hydraulic fracture can increase with time. The term $-P(k)C_k^T(C_kP(k)C_k^T+V_k)^{-1}C_kP(k)$ from the Riccati Equation at Paragraph [0043] reflects the microseismic monitoring results being used to update the fracture model. The use of microseismic monitoring results can help reduce the uncertainty of the predicted length of the hydraulic fracture. However, microseismic monitoring can also be a source of uncertainty (or error). For example, the distance between the sensors and events, the quality of the velocity model used by the computing device to determine the microseismic monitoring results, and the signal processing algorithm used by the computing device to determine the microseismic monitoring results can cause uncertainty in the microseismic monitoring results. The uncertainty of the microseismic monitoring results can contribute to the uncertainty of the predicted length of the hydraulic fracture.

At block 404 the computing device can use the equations described above to determine an uncertainty value of the predicted length of the hydraulic fracture. The uncertainty value of the predicted length can be considered the covariance of estimation error which cannot be directly measured but can be derived as: $\Sigma_L=C_kP(k)C_k^T+V_k$. The covariance of estimation error can be defined as the covariance of difference between a true length of the hydraulic fracture and the predicted length of the hydraulic fracture. The true length of the hydraulic fracture is the actual physical state of the fracture and can only be accurately measured by mining back to the fracture after the hydraulic fracturing operations have ended. During hydraulic fracturing operations, the computing device can assume that the microseismic monitoring results are unbiased, (i.e., while the error may alternate between positive and negative the average value of the microseismic monitoring results error is nearly zero) and may use the microseismic monitoring results as the true length of the hydraulic fracture at the time a microseismic event occurs. In some aspects, the uncertainty value of the predicted length can be determined in a manner other than the covariance of estimation error.

At block 406 the computing device can determine if an uncertainty index (IDX) of the predicted length of the hydraulic fracture exceeds a pre-set maximum. For example, the uncertainty index can be 150 feet. The computing device can receive the pre-set maximum from an input by a user. The computing device can determine the uncertainty index based on the uncertainty value and its behavior or trend over time. The uncertainty index can be defined as:

$$IDX = W_1 \cdot \Sigma_L + W_2 \cdot \frac{d\Sigma_L}{dt}$$

where the trend of the uncertainty value over time is the uncertainty value's derivative with respect to time $$\left(\frac{d\Sigma_L}{dt}\right).$$

The uncertainty value of the predicted length ($\Sigma_L$) and the trend of the uncertainty value over time can each be weighted by weights $W_1$ and $W_2$. The uncertainty index can balance the current uncertainty value and its trend over time. In some aspects, the uncertainty index can be high where the uncertainty value itself is low where the trend of the uncertainty value is to increase quickly. In other aspects, the uncertainty index can be low where the uncertainty value is high but the trend of the uncertainty value is to maintain the same value over time.

If at block 406 the computing device determines that the uncertainty index of the predicted length of the hydraulic fracture exceeds the pre-set maximum then at block 408 the computing device can increase the injection flow rate of the fracturing fluid from an initial or normal injection flow rate to an increased injection flow rate. The increased injection flow rate can cause additional substantially simultaneous microseismic events at the tip of the hydraulic fracture. The computing device can receive microseismic event data from sensors monitoring the additional microseismic events and can update the model using additional microseismic monitoring results based on the additional microseismic event data.

Since the additional microseismic events are occurring substantially simultaneously at (or potentially near) the tip of the hydraulic fracture the computing device can consider them to have occurred at the same location. The uncertainty of the microseismic monitoring results based on these additional substantially simultaneous microseismic events can be reduced N-fold where N is the number of substantially simultaneous microseismic events. For example, if the uncertainty of a single microseismic event along a certain direction is $\Sigma_M$ then the uncertainty of all the substantially simultaneous microseismic events can be described as $$\Sigma_{M, total}^2 = \frac{\Sigma_M}{N}$$

As the number N of substantially simultaneous microseismic events increases, the uncertainty of those events can decrease.

At block 410 the computing device can determine if after the additional substantially simultaneous microseismic events, the uncertainty index of the predicted length after the events continues to exceed the pre-set maximum. If at block 410 the computing device determines that the uncertainty index exceeds the pre-set maximum then the process proceeds to block 412.

At block 412 the computing device determines if the increased injection flow rate is less than a maximum flow rate. The computing device can receive the maximum flow rate from input by a user. If at block 412 the computing device determines that the increased injection flow rate of the fracturing fluid is less than the maximum flow rate than the computing device again increases the injection flow rate of the fracturing fluid at block 408.

If at block 412 the computing device determines the increased injection flow rate is equal to or exceeds the maximum flow rate then at block 414 the computing device decreases the injection flow rate back to the initial injection flow rate and the process returns to block 402 when the computing device receives the next set of microseismic event data.

If at block 410, the computing device determines that the uncertainty index of the predicted length of the hydraulic fracture does not exceed the pre-set maximum then the computing device decreases the injection flow rate back to the normal injection flow rate at block 414.

Figure 5:
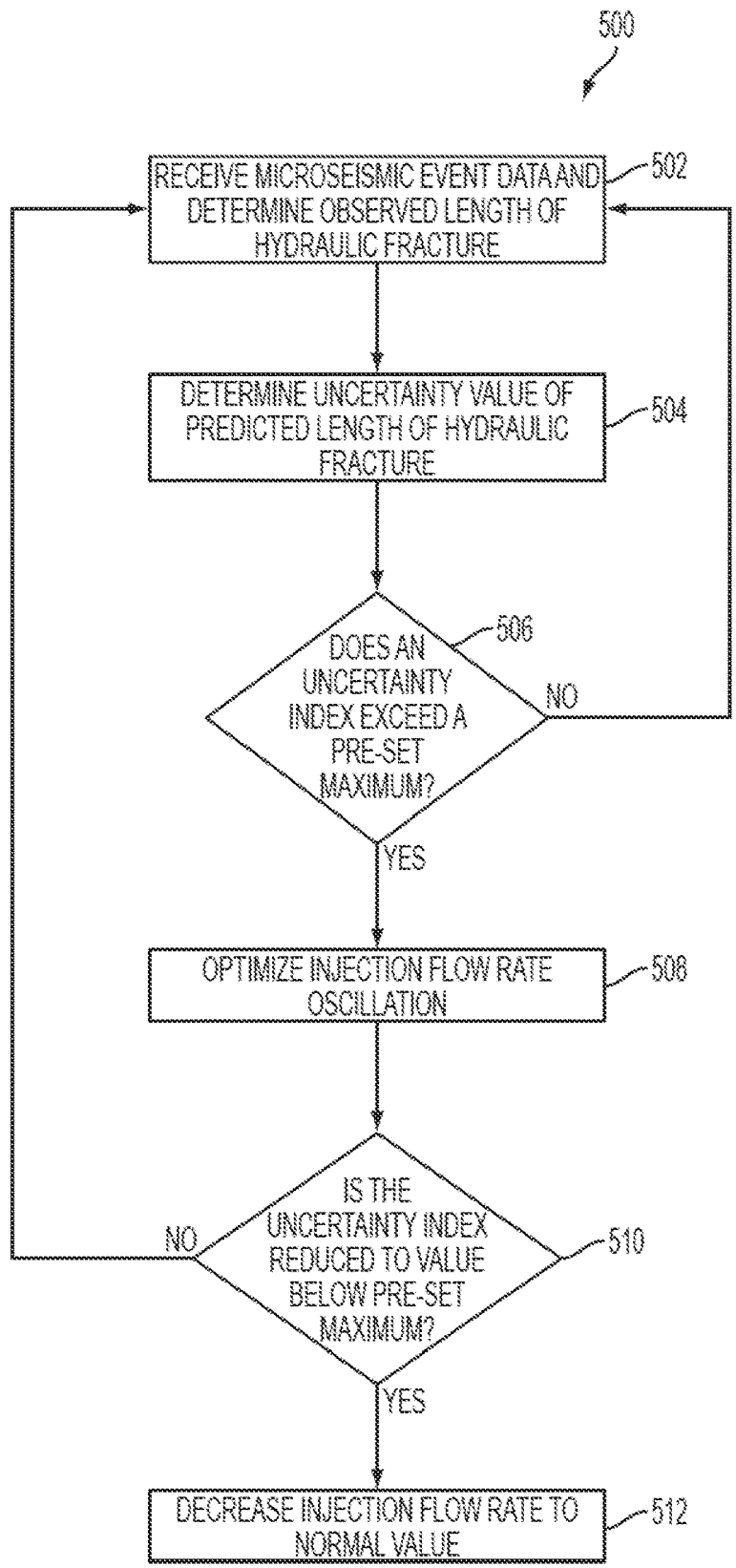
FIG. 5 is an example of a flow chart for a process of reducing microseismic monitoring uncertainty according to one aspect of the present disclosure.

FIG. 5 is an example of a flow chart of a process 500 reducing the uncertainty of microseismic monitoring results according to another aspect of the present disclosure. The process 500 below may be performed in whole or in part by the computing device 124 shown in FIG. 3. At block 502 the computing device receives microseismic event data from sensors monitoring a microseismic event and determines an observed length of the hydraulic fracture using the microseismic event data. The microseismic event data can be received during or after the injection of a fracturing fluid into the subterranean wellbore at an initial injection flow rate.

At block 504 the computing device determines an uncertainty value of a predicted length of the hydraulic fracture based on a fracture model. The computing device can use the PKN model to determine a predicted fracture length of a bi-wing hydraulic fracture as described above with respect to FIG. 4. The computing device can determine the uncertainty value of the predicted length, which can be defined as the covariance of estimation error, to be: $\Sigma_L = C_k P(k) C_k^T + V_k$.

At block 506 the computing device determines if an uncertainty index (IDX) of the predicted hydraulic fracture length exceeds a pre-set maximum. For example, the pre-set maximum can be 150 feet. The computing device can receive the pre-set maximum from an input by a user. The computing device can determine the uncertainty index as being:

$$IDX = W_1 \cdot \Sigma_L + W_2 \cdot \frac{d\Sigma_L}{dt}$$

where $\Sigma_L$ is the uncertainty value of the predicted length of the hydraulic fracture and $$\frac{d\Sigma_L}{dt}$$

is the trend of the uncertainty value over time. Each variable can be weighted by weights $W_1$ and $W_2$.

If at block 506 the computing device determines that the uncertainty index of the predicted length of the hydraulic fracture exceeds the pre-set maximum then at block 508 the computing device can oscillate the injection flow rate of the fracturing fluid at an optimal oscillation waveform. The computing device, by oscillating the injection flow rate, can cause a pressure wave within the hydraulic fracture. The pressure wave can cause additional substantially simultaneous microseismic events at (or near) the tip of the hydraulic fracture. The additional substantially simultaneous microseismic events can reduce the uncertainty index of the next predicted length of the hydraulic fracture by the fracture model. The computing device can optimize the waveform by altering the magnitude, amplitude, or waveform shape of the injection flow rate.

In some aspects, the computing device can use a model predictive control (MPC) approach to optimize the parameters of the injection flow rate waveform. In another aspect, the computing device can use a modeless approach to optimize the parameters of the injection flow rate waveform. For example, the computing device can use an extremum seeking control (ESC) approach. The computing device can use an MPC, ESC, or another suitable approach to determine the optimal oscillation waveform of the injection flow rate to generate a sufficient number of additional substantially simultaneous microseismic events. The computing device can include a fluid leak-off rate estimation when using either the MPC or ESC approach as a feed-forward term for the control algorithm to reach the optimal waveform parameter or waveform faster.

The computing device can receive microseismic event data from sensors monitoring the additional substantially simultaneous microseismic events that occur during or after the oscillation of the injection flow rate at block 508. The computing device can update the model using microseismic monitoring results based on the additional substantially simultaneous microseismic events. For example, the computing device can update the model with the observed length of the hydraulic fracture based on the substantially simultaneous microseismic events.

At block 510 the computing device can calculate the uncertainty index of the predicted length of the hydraulic fracture by the updated fracture model and determine if the uncertainty index exceeds the pre-set maximum. If at block 510 the computing device determines that the uncertainty index of the predicted length of the hydraulic fracture exceeds the pre-set maximum then the computing device can maintain the oscillation of the injection flow rate and can return to block 502 when it receives a next set of microseismic event data from a new microseismic event monitored by the sensors in the subterranean formation.

If at block 510, the computing device determines that the uncertainty index of the predicted length of the hydraulic fracture by the updated fracture model does not exceed the pre-set maximum then the computing device decreases the injection flow rate back to the initial flow rate at block 512.

In some aspects of the present disclosure, the computing device can determine an observed height other geometry of the hydraulic fracture using the microseismic monitoring results. The computing device can also determine a predicted height or other geometry of the hydraulic fracture using a fracture model. For example, the geometry of a hydraulic fracture with a constant length and growing height can be estimated or predicted using a fracture model. The computing device can also determine an uncertainty value and an uncertainty index of the predicted height (or other geometry) of the hydraulic fracture.

Figure 6:
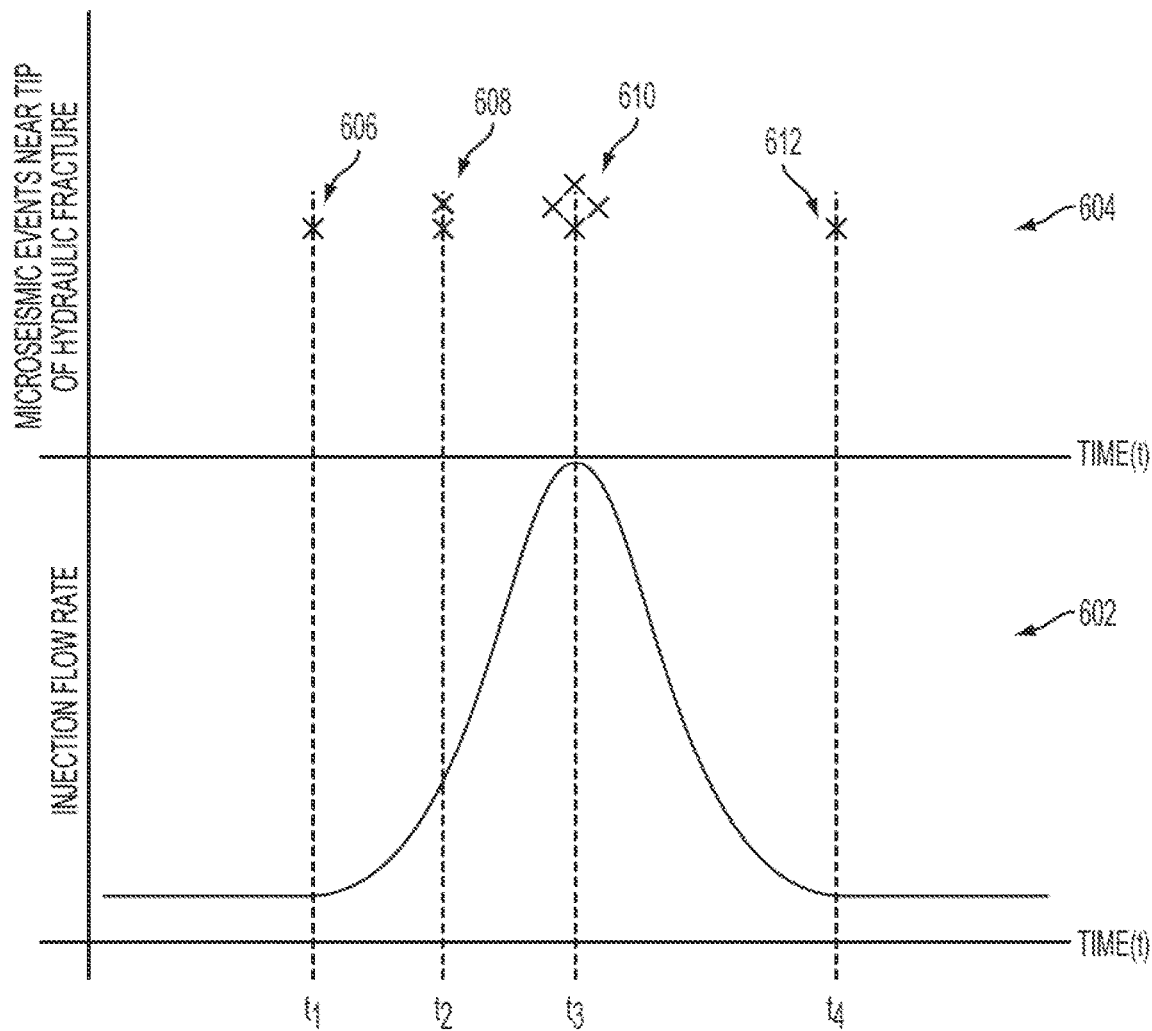
FIG. 6 is a graphical illustration of a process for reducing microseismic monitoring uncertainty according to one aspect of the present disclosure.

FIG. 6 is a graphical illustration of a process for reducing microseismic monitoring uncertainty according to one aspect of the present disclosure. A first graph 602 depicts the injection flow rate of a fracturing fluid introduced into a subterranean wellbore with a hydraulic fracture over a period of time. A second graph 604 depicts the number of microseismic events occurring at the tip of the hydraulic fracture over the same period of time. During the period of time depicted in graphs 602 and 604 the computing device performs a process for reducing the uncertainty of microseismic monitoring results according to one aspect of the present disclosure.

As shown in graph 602, at a time $t_1$ the injection flow rate is a normal or initial flow rate. At time $t_1$ a single microseismic event 606 occurs near the tip of the hydraulic fracture. The computing device can determine an observed location of the microseismic event 606 from data received from sensors monitoring the microseismic event 606. The computing device can determine a predicted geometry of the hydraulic fracture using a fracture model. For example, the computing device can use the PKN model to determine a predicted length of the hydraulic fracture if it is a bi-wing fracture. The computing device can determine an uncertainty value of the predicted geometry of the hydraulic fracture. The computing device can also determine an uncertainty index that consists of the uncertainty of value of the predicted geometry of the hydraulic fracture and its trend over time. The uncertainty value and its trend over time can be separately weighted in the calculation of the uncertainty index.

At the time $t_1$ the computing device determines that the uncertainty index exceeds a pre-set maximum. The pre-set maximum can be received by the computing device from input by a user. The computing device, in response determining the uncertainty index exceeds a pre-set maximum, increases the injection flow rate between time $t_1$ and $t_2$. At time $t_2$, following the increased injection flow rate, two substantially simultaneous microseismic events 608 occur at the tip of the hydraulic fracture. The computing device determines an observed location of the microseismic events 608 from data received from sensors monitoring the microseismic events 608. The computing device can consider the two microseismic events 608 to have occurred at the same location since they occurred substantially simultaneously. At time $t_2$, the computing device determines that an updated uncertainty index of an updated predicted geometry of the hydraulic fracture exceeds the pre-set maximum. From time $t_2$ to time $t_3$ the computing device increases the injection flow rate in response to determining that the updated uncertainty index exceeded the pre-set maximum. In some aspects, the computing device can reduce the injection flow rate at time $t_2$ in response to determining the updated uncertainty index exceeds the pre-set maximum when the injection flow rate is at a maximum rate. The maximum rate can be received by the computing device from an input by a user.

At time $t_3$ four substantially simultaneous microseismic events 610 occur at the tip of the hydraulic fracture. The computing device determines that a second updated uncertainty index of a second updated predicted geometry has been reduced to a value that does not exceed the pre-set maximum. Between time $t_3$ and $t_4$ the computing device reduces the injection flow rate to the initial injection flow rate in response to determining that the second updated uncertainty index is below the pre-set maximum.

At time $t_4$ a microseismic event 612 occurs near the tip of the hydraulic fracture. The computing device determines that a third updated uncertainty index of a third updated predicted geometry does not exceed the pre-set maximum. In response to determining the third updated uncertainty index does not exceed the pre-set maximum the computing device maintains the initial injection flow rate.

In some aspects, microseismic monitoring uncertainty can be reduced. A computing device can determine a predicted geometry of a hydraulic fracture in a subterranean formation using a fracture model. The computing device can also use information related to properties of a fracturing fluid that is introduced into the subterranean formation. The computing device can determine an uncertainty index of the predicted geometry. The uncertainty index can be based on an uncertainty value of the predicted geometry and a trend of uncertainty values. The computing device can output a command to increase an injection flow rate of the fracturing fluid from an initial injection flow rate to an increased injection flow rate in response to determining the uncertainty index exceeds a pre-set maximum. The initial injection rate can be less than a maximum flow rate.

In some aspects, a system can include a computing device that has a non-transitory computer-readable medium that has code executable for causing the computing device to determine a predicted geometry of a hydraulic fracture in a subterranean formation using a fracture model and also using information about a fracturing fluid. The code can also be executable for causing the computing device to determine an uncertainty index of the predicted geometry. The uncertainty index can be based on an uncertainty value of the predicted geometry and a trend of uncertainty values. The code can also be executable for causing the computing device to output a command to increase an injection flow rate of the fracturing fluid from an initial injection flow rate to an increased injection flow rate in response to determining the uncertainty index exceeds a pre-set maximum. The initial injection rate can be less than a maximum flow rate.

In some aspects, a system can include a plurality of sensors and a computing device. The computing device can determine a predicted geometry of a hydraulic fracture in a subterranean formation using a fracture model. The computing device can also use information related to properties of a fracturing fluid that is introduced into the subterranean formation. The computing device can determine an uncertainty index of the predicted geometry. The uncertainty index can be based on an uncertainty value of the predicted geometry and a trend of uncertainty values. The computing device can output a command to increase an injection flow rate of the fracturing fluid from an initial injection flow rate to an increased injection flow rate in response to determining the uncertainty index exceeds a pre-set maximum. The initial injection rate can be less than a maximum flow rate.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method, comprising:
   determining, by a computing device using a fracture model, a predicted geometry of a hydraulic fracture in a subterranean formation based on properties of a fracturing fluid that is introduced into the subterranean formation;
   determining, by the computing device, an uncertainty index of the predicted geometry of the hydraulic fracture, wherein the uncertainty index is defined at least in part by an uncertainty value of the predicted geometry of the hydraulic fracture and a trend of the uncertainty value of the predicted geometry of the hydraulic fracture over time; and
   outputting, by the computing device, a command to increase an injection flow rate of the fracturing fluid from an initial injection flow rate to an increased injection flow rate in response to determining the uncertainty index exceeds a pre-set maximum, the initial injection flow rate being less than a maximum flow rate;
   wherein the uncertainty index is defined at least in part by a covariance of estimation error of the predicted geometry of the hydraulic fracture, wherein the covariance of estimation error of the predicted geometry of the hydraulic fracture is defined at least in part by (i) a true geometry of the hydraulic fracture and (ii) the predicted geometry of the hydraulic fracture, wherein the true geometry of the hydraulic fracture is defined at least in part by the information about microseismic events in the subterranean formation subsequent to a fracturing fluid being introduced into the subterranean formation transmitted by the plurality of sensors.

2. The method of claim 1, further comprising:
   receiving, by the computing device, information about one or more microseismic events in the subterranean formation from a plurality of sensors that is monitoring the subterranean formation;
   generating, by the computing device, an updated fracture model to using the information about the one or more microseismic events;
   determining, by the computing device, an updated predicted geometry of the hydraulic fracture in the subterranean formation using the updated fracture model;
   determining, by the computing device, an updated uncertainty index based on an updated uncertainty value of the updated predicted geometry of the hydraulic fracture and the trend of uncertainty values; and
   outputting, by the computing device, a command to reduce the injection flow rate of the fracturing fluid to the initial injection flow rate in response to determining that the updated uncertainty index is less than or equal to the pre-set maximum,
   wherein the fracture model is the Perkins-Kern-Nordgren model.

3. The method of claim 1, further comprising:
   receiving, by the computing device, information about one or more microseismic events in the subterranean formation from a plurality of sensors that is monitoring the subterranean formation;
   generating, by the computing device, an updated fracture model using the information about the one or more microseismic events;
   determining, by the computing device, an updated predicted geometry of the hydraulic fracture in the subterranean formation using the updated fracture model;
   determining, by the computing device, an updated uncertainty index based on an updated uncertainty value of the updated predicted geometry of the hydraulic fracture and the trend of uncertainty values; and
   outputting, by the computing device, a command to reduce the injection flow rate of the fracturing fluid to the initial injection flow rate in response to determining that the updated uncertainty index exceeds the pre-set maximum, the increased injection flow rate exceeding the maximum flow rate.

4. The method of claim 1, wherein the predicted geometry of the hydraulic fracture is a predicted length of the hydraulic fracture.

5. The method of claim 1, wherein the properties of the fracturing fluid include at least one of the initial injection flow rate of the fracturing fluid and a viscosity of the fracturing fluid.

6. The method of claim 1, further comprising:
   generating, by the computing device, a visual representation of the hydraulic fracture based on the fracture model.

7. A system comprising:
   a computing device having a non-transitory computer-readable medium on which is code that is executable for causing the computing device to:
   determine, using a fracture model, a predicted geometry of a hydraulic fracture in a subterranean formation based on properties of a fracturing fluid that is introduced into the subterranean formation;
   determine an uncertainty index of the predicted geometry of the hydraulic fracture, wherein the uncertainty index is defined at least in part by an uncertainty value of the predicted geometry of the hydraulic fracture and a trend of the uncertainty value of the predicted geometry of the hydraulic fracture over time; and
   output a command to increase an injection flow rate of the fracturing fluid from an initial injection flow rate to an increased injection flow rate in response to determining that the uncertainty index exceeds a pre-set maximum, the initial injection flow rate being less than a maximum flow rate;
   wherein the uncertainty index is defined at least in part by a covariance of estimation error of the predicted geometry of the hydraulic fracture, wherein the covariance of estimation error of the predicted geometry of the hydraulic fracture is defined at least in part by (i) a true geometry of the hydraulic fracture and (ii) the predicted geometry of the hydraulic fracture, wherein the true geometry of the hydraulic fracture is defined at least in part by the information about microseismic events in the subterranean formation subsequent to a fracturing fluid being introduced into the subterranean formation transmitted by the plurality of sensors.

8. The system of claim 7, wherein the code is executable for causing the computing device to:
   receive information about one or more microseismic events in the subterranean formation from a plurality of sensors that is monitoring the subterranean formation;

generate an updated fracture model using the information about the one or more microseismic events;
determine an updated predicted geometry of the hydraulic fracture in the subterranean formation using the updated fracture model;
determine an updated uncertainty index based on an updated uncertainty value of the updated predicted geometry of the hydraulic fracture and the trend of uncertainty values; and
output a command to reduce the injection flow rate of the fracturing fluid to the initial injection flow rate in response to determining that the updated uncertainty index is less than or equal to the pre-set maximum.

9. The system of claim 7, wherein the code is executable for causing the computing device to:
receive information about one or more microseismic events in the subterranean formation from a plurality of sensors that is monitoring the subterranean formation;
generate an updated fracture model using the information about the one or more microseismic events;
determine an updated predicted geometry of the hydraulic fracture in the subterranean formation using the updated fracture model;
determine an updated uncertainty index based on an updated uncertainty value of the updated predicted geometry of the hydraulic fracture and the trend of uncertainty values; and
output a command to reduce the injection flow rate of the fracturing fluid to the initial injection flow rate in response to determining that the updated uncertainty index exceeds the pre-set maximum, the increased injection flow rate being equal to or greater than the maximum flow rate,
wherein the fracture model is the Perkins-Kern-Nordgren model.

10. The system of claim 7, wherein the predicted geometry of the hydraulic fracture is a predicted length of the hydraulic fracture.

11. The system of claim 7, wherein the properties of the fracturing fluid include at least one of the initial injection flow rate of the fracturing fluid and a viscosity of the fracturing fluid.

12. The system of claim 7, wherein the code is executable for causing the computing device to:
generate a visual representation of the hydraulic fracture based on the fracture model.

13. The system of claim 7, wherein the uncertainty index is equal to $$W_1 \cdot \Sigma_G + W_2 \cdot \frac{d\Sigma_G}{dt},$$

wherein $\Sigma_G$ is a covariance of estimation error of the predicted geometry of the hydraulic fracture and $$\frac{d\Sigma_G}{dt}$$

is the trend of the uncertainty value of the predicted geometry of the hydraulic fracture over time, and $W_1$ and $W_2$ are weights.

14. A system comprising:
a plurality of sensors for transmitting information about microseismic events in a subterranean formation subsequent to a fracturing fluid being introduced into the subterranean formation; and
a computing device having a non-transitory computer-readable medium on which is code that is executable for:
determining, using a fracture model, a predicted geometry of a hydraulic fracture in the subterranean formation based on properties of the fracturing fluid;
determining an uncertainty index of the predicted geometry of the hydraulic fracture, wherein the uncertainty index is defined at least in part by an uncertainty value of the predicted geometry of the hydraulic fracture and a trend of the uncertainty value of the predicted geometry of the hydraulic fracture over time; and
outputting a command to increase an injection flow rate of the fracturing fluid from an initial injection flow rate to an increased injection flow rate in response to determining that the uncertainty index exceeds a pre-set maximum, the initial injection flow rate being less than a maximum flow rate;
wherein the uncertainty index is defined at least in part by a covariance of estimation error of the predicted geometry of the hydraulic fracture, wherein the covariance of estimation error of the predicted geometry of the hydraulic fracture is defined at least in part by (i) a true geometry of the hydraulic fracture and (ii) the predicted geometry of the hydraulic fracture, wherein the true geometry of the hydraulic fracture is defined at least in part by the information about microseismic events in the subterranean formation subsequent to a fracturing fluid being introduced into the subterranean formation transmitted by the plurality of sensors.

15. The system of claim 14, the computing device also for:
receiving information about additional microseismic events in the subterranean formation from the plurality of sensors;
generating an updated fracture model using the information about the additional microseismic events;
determining an updated predicted geometry of the hydraulic fracture in the subterranean formation using the updated fracture model;
determining an updated uncertainty index based on an updated uncertainty value of the updated predicted geometry of the hydraulic fracture and the trend of uncertainty values; and
outputting a command to reduce the injection flow rate of the fracturing fluid to the initial injection flow rate in response to determining the updated uncertainty index is less than or equal to the pre-set maximum.

16. The system of claim 14, the computing device also for:
receiving information about additional microseismic events in the subterranean formation from the plurality of sensors;
generating an updated fracture model using the information about the additional microseismic events;
determining an updated predicted geometry of the hydraulic fracture in the subterranean formation using the updated fracture model;
determining an updated uncertainty index based on an updated uncertainty value of the updated predicted geometry of the hydraulic fracture and the trend of uncertainty values; and
outputting a command to reduce the injection flow rate of the fracturing fluid to the initial injection flow rate in response to determining that the updated uncertainty index exceeds the pre-set maximum, the increased injection flow rate being equal to or greater than the maximum flow rate.

17. The system of claim 14, the computing device also for:

generating visual representation of the hydraulic fracture based on the fracture model.

18. The system of claim 14, wherein the predicted geometry of the hydraulic fracture is a predicted length of the hydraulic fracture and wherein the facture model is the Perkins-Kern-Nordgren model.

* * * * *